United States Patent [19]

Fletcher et al.

[11] 4,258,336

[45] Mar. 24, 1981

[54] PULSED RING LASER FIBER GYRO

[75] Inventors: Paul C. Fletcher, El Cajon; Verne E. Hildebrand, San Diego, both of Calif.

[73] Assignee: The United States of America as represented by the Secretary of the Navy, Washington, D.C.

[21] Appl. No.: 59,405

[22] Filed: Jul. 20, 1979

[51] Int. Cl.³ .............................................. H01S 3/083
[52] U.S. Cl. ................................. 331/94.5 C; 356/350
[58] Field of Search ................... 356/350; 331/94.5 C, 331/94.5 N; 350/96.10, 96.21, 96.24

[56] References Cited

U.S. PATENT DOCUMENTS

| | | | |
|---|---|---|---|
| 3,943,457 | 3/1976 | Lehmberg | 330/4.3 |
| 3,949,315 | 4/1976 | Zeidler | 330/4.3 |
| 4,013,365 | 3/1977 | Vali et al. | 251/205 |
| 4,015,217 | 3/1977 | Snitzer | 331/94.5 E |

Primary Examiner—William L. Sikes
Assistant Examiner—Leon Scott, Jr.
Attorney, Agent, or Firm—R. S. Sciascia; Ervin F. Johnston; Thomas Glenn Keough

[57] ABSTRACT

An improvement for a ring laser gyro employs pulsed optical signals in a fiber optic loop. Clockwise and counterclockwise traveling pulsed optical signals are generated by a pair of optical amplifiers and a beamsplitter/coupler feeds the signals to a detector. The clockwise and counterclockwise signals do not meet in either of the optical amplifiers, but do arrive in coincidence at the beamsplitter and detector. Although low rotation rate lock-in limits the minimum detection rate in a continuous wave laser gyro, it does not so restrict the pulsed laser gyro's ability to detect low rotation rates because there is little, if any, coupling between the clockwise and counterclockwise modes of signal propagation.

4 Claims, 2 Drawing Figures

PULSED RING LASER FIBER GYRO

BACKGROUND OF THE INVENTION

Continuous wave ring laser gyros have evolved to a highly sophisticated state of development. Their proposed use in inertial guidance systems which stabilize airplanes, helicopters, weapons' delivery systems, cameras, radar antennas, and other vehicles is widespread. The gyros sense attitude changes about an axis of rotation and, usually three of them are orthogonally disposed with respect to one another to provide indications of three dimensional motion. One limitation of gaseous ring laser gyros is a phenomenon known as lock-in. This arises from coupling between the clockwise and counterclockwise modes of propagation and is attributed to the scattering of the gas molecules in the laser gain medium. The lock-in rate is limited to a value of about 0.003 degrees per hour.

Since the output of a laser gyro is observed as a function of the rotation rate, it can be seen that the difference frequency between the clockwise and counterclockwise modes is proportional to the input at high rates. However, as the input rate is reduced, the frequency difference between the two oscillators will fall to zero before the input rate goes to zero. The input rate at which this lock-in, zero difference frequency occurs is called the lock-in rate.

The lock-in rate is found to depend primarily upon the coupling factor which is dependent upon the wavelength. In order to reduce the lock-in rate, it has been found that the smaller the wavelength, the better, and the smaller the coupling factor, the better.

The choice of wavelengths is restricted to values at which laser oscillation can occur. The minimum limiting value of the coupling factor is determined by Rayleigh scattering which increases rapidly as the wavelength decreases but present gyros are far from this limitation due to imperfection gain medium backscattering.

Making the area enclosed by the optical pathway in the laser gyro falls within practical considerations of size, weight, and power. Usually, space limitations require that the gyro should be as small as possible, e.g., less than a meter in diameter.

The last consideration governing lock-in rate usually is determined by the quality of the laser cavity. Scattering from windows, mirrors, and other elements within the cavity should be reduced to an absolute minimum. However, there still exists the coupling that arises from the scattering of the gas molecules in the laser gain medium. As mentioned before, to date, coupling arising from scattering has prevented lock-in rate from being less than 0.003 degrees per hour in lasers operating in a continuous wave mode.

Thus, there is a continuing need in the state-of-the-art for a ring laser having a greatly reduced lock-in rate to provide a hitherto unrealized rotation rate resolution.

SUMMARY OF THE INVENTION

The present invention is directed to providing an improvement for a ring laser which improves the resolution at low rotation rates. An optical fiber forms a closed optical path and first and second optical amplifiers are optically coupled to the path. A detector is coupled in the optical path and an initiating means actuates both optical amplifiers to create clockwise and counterclockwise pulsed optical signals in the closed optical path. The clockwise and counterclockwise pulsed optical signals are initiated in a sequence to assure their noncoincidental passing through the first and second optical amplifiers and their coincidental passage through the detecting means so that a beat frequency indicative of the laser's rotation rate can be detected.

It is a prime object of this invention to provide an improved laser gyro with increased rotional sensitivity.

Another object is to provide an improved laser gyro operating in a pulsed mode as opposed to a continuous wave mode.

Yet another object is to provide an improved laser gyro advantageously employing a fiber optic cable as a closed optical path.

Yet another object is to provide a laser gyro having a greatly increased closed optical path length due to the inclusion of a coiled elongate fiber cable.

Still another object is to provide an improved laser gyro having a greatly reduced lock-in rate.

These and other objects of the invention will become more readily apparent from the ensuing description when taken with the drawings.

DESCRIPTION OF THE PREFERRED EMBODIMENT

Figure 1:
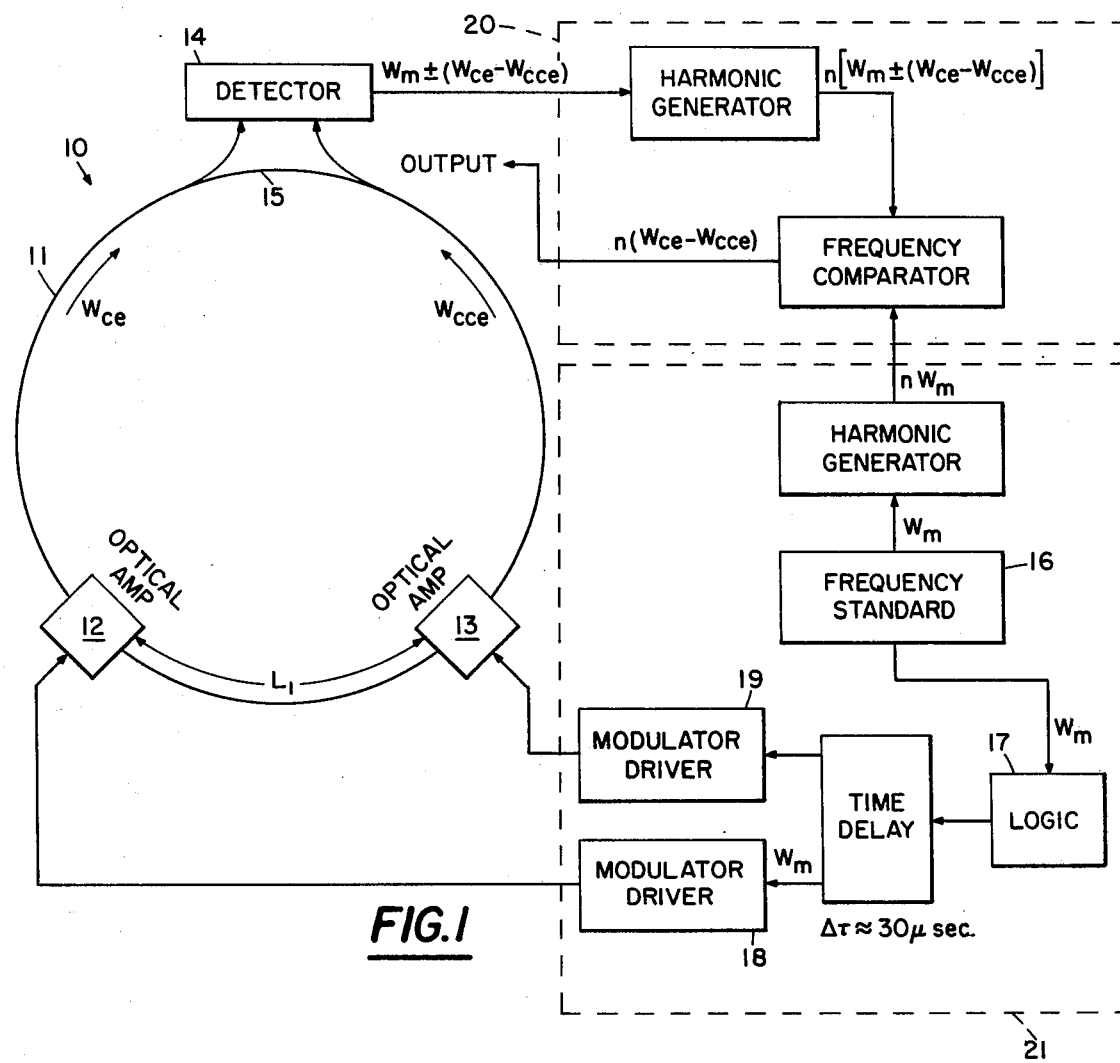
FIG. 1 depicts a block diagrammatical representation of the invention.

Referring now to the drawings, a pulsed ring laser 10 reduces the problem of lock-in which heretofore has compromised the low rotation response of continuous wave ring lasers. It is the very essence of this invention that the clockwise and counterclockwise modes of signal transmission do not cross within an amplifier but rather meet in the detector so that a beat signal can be monitored and the rotation rate resolved.

A closed optical path is created by at least one loop of a fiber optic 11. The length of the fiber optic cable can be greatly increased without overly increasing the lateral dimensions of the ring laser by coiling it atop itself so that several kilometers could be coiled in a relatively small space. A pair of optical amplifiers 12 and 13 are interposed in the fiber optic loop and ensure that bidirectionally traveling pulsed optical signals can be generated in the fiber optic loop and monitored by a detector 14.

The optical amplifiers selected can be any of a number of commercially available models having the proper response times and bandwidths. A relatively uncomplicated design could employ a neodymium doped glass fiber fused into the fiber optic loop and pumped by circumferentially disposed light emitting diodes or lasers. An alternate design would be to provide semiconductor optical amplifiers. Irrespective of which is chosen, to assure oscillation, the gain of both the optical amplifiers must be sufficient to overcome the losses associated with the fiber optic loop, the detector, and the amplifiers.

There are a wide variety of suitable detectors adaptable for use in the pulsed laser gyro. Photomultiplier tubes could be selected when greater sensitivity is needed, although, a PIN device may be more likely to be chosen in an actual hardware application.

The final element in the exemplary pulsed ring laser is a coupler 15 to link the clockwise and counterclockwise pulses of optical energy to detector. One that is highly acceptable is the three dB coupler disclosed in a pending U.S. patent application, No. 014,798 assigned to the Government of the United States of America as represented by the Secretary of the Navy by Matt L. McLandrich and entitled "Three dB Single Mode Optical Fiber Interferometer Beamsplitter/Coupler". Couplers which supply greater isolation would probably be used to reduce the demand on the optical amplifiers.

Irrespective of which pair of optical amplifiers, the detector and coupler are selected, certain characteristics must be matched, for example, bandwidths frequency response, etc.

Referring once again to the drawings, switching circuitry 21 includes a frequency standard generator 16 which determines the rate at which the optical amplifiers, 12 and 13, are actuated. The actuation frequency $\omega_n$ is fed into a logic circuitry 17 functioning to enable the sequence at which a pair of modulator/drivers, 18 and 19, are actuated. Actuation of the modulator/driver units enables one of the optical amplifiers, 12 or 13, to first initiate a pulse of optical energy and subsequently, the other amplifier will amplify it. This sequence creates a clockwise $\omega_{cl}$ or counterclockwise $\omega_{ccl}$ optical pulse. Reversal of the sequence creates the opposite traveling pulsed wave.

A time delay is introduced by the logic circuitry 17 so that a pulse fed to, for example, optical amplifier 12, leads or lags a pulse fed to operational amplifier 13 by a predetermined amount, for example, 30 microseconds. The time separation between pulses is such that a pulse initiated by one amplifier arrives at the other amplifier where it is amplified. To repeat, the timing circuit employed must be such as to assure that there is no overlapping between the oppositely traveling clockwise and counterclockwise pulses in the amplifiers, yet must be such that these pulses should traverse the coupler and enter the detector simultaneously.

Figure 2:
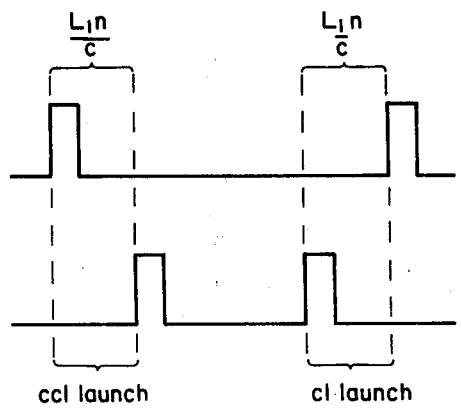
FIG. 2 is a representation of the pulsing sequence.

Referring to FIG. 2, the actuation sequence is demonstrated so that clockwise $\omega_{cl}$ and counterclockwise $\omega_{ccl}$ pulsed optical signals are caused to travel through the fiber optic loop to the detectors. It is essential that the pulsed optical energy in either the clockwise or counterclockwise directions does not arrive in an optical amplifier at the same time that the other directional component of the pulsed optical energy is generated in the other amplifier. It is also essential that both the clockwise and counterclockwise pulsed optical signals arrive at the detector at the same time so as to assure the generation of beat signals which are indicative the rotation rate of the ring laser. To do otherwise would firstly, introduce coupling between the two counter rotating beams and secondly, not provide the resultant beat signal necessary for rotation rate determination.

Generation of the counterclockwise pulsed optical signal calls for the arrival of an initiating pulse at amplifier 12. Shortly after, long enough for the initiating pulse to be out of amplifier 12 and long enough for the pulse to be at amplifier 13, amplifier 13 is actuated to amplify the initiated pulse coming from amplifier 12. A counterclockwise pulsed optical wave is thereby launched.

Similarly, a traveling pulsed optical wave is launched in a clockwise direction by initiating amplifier 13 first and subsequently amplifier 12. The timing of these pulsing operations must be such that two oppositely traveling waves do not meet in either amplifier. The waves must, however, meet in the output coupler and detector in order to get the beat frequency to determine rotation rate. A sequence of such pulses at a frequency of approximately 30 kilohertz can provide an oscillatory rate sufficient to yield indications of rotation of the ring laser.

Higher stability is achieved by integrating the indicated beat frequencies in the detector associated circuitry 20. Harmonics of n times the fundamental 30 kilohertz driving frequency are generated and beat against a similarly generated harmonic frequency standard. This increases the apparent effect of the beat frequency and the sensitivity is increased. However, in this regard it should be recalled that making the wavelength smaller may increase the Rayleigh scattering by a factor which increases rapidly as the wavelength decreases. However, within empirically determined limits, sensitivity can be increased appreciably.

The advantage of the aforedescribed pulsed ring laser is the sensitivity increase to lower rotation rates as compared to continuous wave ring lasers. Rates of 0.01 degrees per hour are feasible employing the disclosed pulsed ring laser as opposed to the 0.1 degrees per hour lock-in rate associated with conventional continuous wave ring lasers.

Obviously, many other modifications and variations of the present invention are possible in the light of the above teachings. It is therefore to be understood that within the scope of the appended claims the invention may be practiced otherwise than as specifically described.

What is claimed is:

1. An improvement for a ring laser which improves the resolution at low rotation rates comprising:
   means for forming a closed optical path;
   a first and a second light amplifying means optically coupled to the closed optical path;
   means coupled in the closed optical path for detecting optical beat signals; and
   means coupled to the first and second light amplifying means for initiating clockwise and counterclockwise pulsed optical signals in the closed optical path in a sequence to assure their noncoincidental passage through the first and second amplifying means and their coincidental passage through the detecting means.

2. An improved ring laser according to claim 1 in which the optical path forming means is at least one turn of an optical fiber and the first and second light amplifying means are a pair of optical amplifiers.

3. An improved ring laser according to claim 2 further including:
   an optical coupler disposed adjacent the optical fiber for transferring the clockwise and counterclockwise pulsed optical signals to the detecting means.

4. An improved ring laser according to claim 1 in which the initiating means provides actuating pulses for both the first and second amplifying means in a repetitive first sequence and an inverse sequence to assure the clockwise and counterclockwise pulsed optical signals.

* * * * *